_(12)_ United States Patent
Dalcher et al.

(10) Patent No.: US 7,784,034 B1
(45) Date of Patent: Aug. 24, 2010

(54) SYSTEM, METHOD AND COMPUTER PROGRAM PRODUCT FOR HOOKING A COM INTERFACE

(75) Inventors: Gregory William Dalcher, Tigard, OR (US); Oded Horovitz, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 1222 days.

(21) Appl. No.: 11/314,398

(22) Filed: Dec. 21, 2005

(51) Int. Cl.
*G06F 9/44* (2006.01)
*G06F 3/00* (2006.01)
*G06F 9/46* (2006.01)
*G06F 13/00* (2006.01)

(52) U.S. Cl. .................. 717/130; 717/127; 719/316; 719/318

(58) Field of Classification Search .................. None
See application file for complete search history.

(56) References Cited

U.S. PATENT DOCUMENTS

| 2002/0065802 | A1 | 5/2002 | Uchiyama | 707/1 |
| 2002/0070978 | A1 | 6/2002 | Wishoff et al. | 345/811 |
| 2003/0056116 | A1 | 3/2003 | Bunker et al. | 713/201 |
| 2004/0199763 | A1* | 10/2004 | Freund | 713/154 |
| 2005/0015760 | A1 | 1/2005 | Ivanov et al. | 717/168 |
| 2006/0031755 | A1* | 2/2006 | Kashi | 715/512 |
| 2006/0179484 | A1* | 8/2006 | Scrimsher et al. | 726/23 |
| 2006/0184998 | A1 | 8/2006 | Smith et al. | 726/3 |
| 2007/0112824 | A1 | 5/2007 | Lock et al. | 707/102 |

OTHER PUBLICATIONS

"Spying on COM Objects", Dmitri Leman, 1999.*
"The Component Object Model: A Technical Overview", Sara Williams et al, Microsoft Corporation, 1994.*
"Intrusion Prevention Systems: A Look Under the Hood" Leaders In High Speed Intrusion Prevention http://www.charlotteissa.com/meetings/Intrusion_Prevention_Systems.pdf.
U.S. Appl. No. 11/194,300, filed Aug. 1, 2005.
Press Release 181, "Finjan's Latest Security Update Includes Virtual Patch against Unpublished Vulnerability," http://www.finjan.com/company/newsroom/press_show.asp?press_release_id=181, Jun. 14, 2005.
Office Action Summary from U.S. Appl. No. 11/194,300 mailed on Sep. 15, 2009.
Final Office Action Summary from U.S. Appl. No. 11/194,300 mailed on Apr. 29, 2010.

* cited by examiner

*Primary Examiner*—Lewis A Bullock, Jr.
*Assistant Examiner*—Mark A Gooray
(74) *Attorney, Agent, or Firm*—Zilka-Kotab, PC

(57) ABSTRACT

A hooking system, method and computer program product are provided. In use, a component object model (COM) interface is hooked. To this end, a function may be performed based on the hooking.

10 Claims, 4 Drawing Sheets

SYSTEM, METHOD AND COMPUTER PROGRAM PRODUCT FOR HOOKING A COM INTERFACE

FIELD OF THE INVENTION

The present invention relates to hooking applications, and more particularly to hooking various interfaces.

BACKGROUND

Hooking applications are becoming increasingly popular, especially in the security and network management arts. Such hooking applications are adapted for hooking various aspects of an interface. By way of example, some of such applications are capable of hooking application program interface (API) calls.

Such API hooking is a technique where an API is modified so that subsequent invocations of a particular function transfer control to a handler. This handler may then, in turn, analyze the original API invocation, report usage of the API, modify relevant parameters, etc. Further, in the case of security applications, API hooking may serve to enable a decision as to allowing or disallowing the original API to be invoked.

Unfortunately, hooking applications are typically only capable of hooking a limited few predetermined types of interfaces. A non-exhaustive list of interfaces that are capable of being hooked by existing hooking applications include, but are not limited to a Network Driver Interface Specification (NDIS) interface, etc.

There is thus a need for overcoming these and/or other problems associated with the prior art.

SUMMARY

A hooking system, method and computer program product are provided. In use, a component object model (COM) interface is hooked. To this end, a function may be performed based on the hooking.

DETAILED DESCRIPTION

Figure 1:
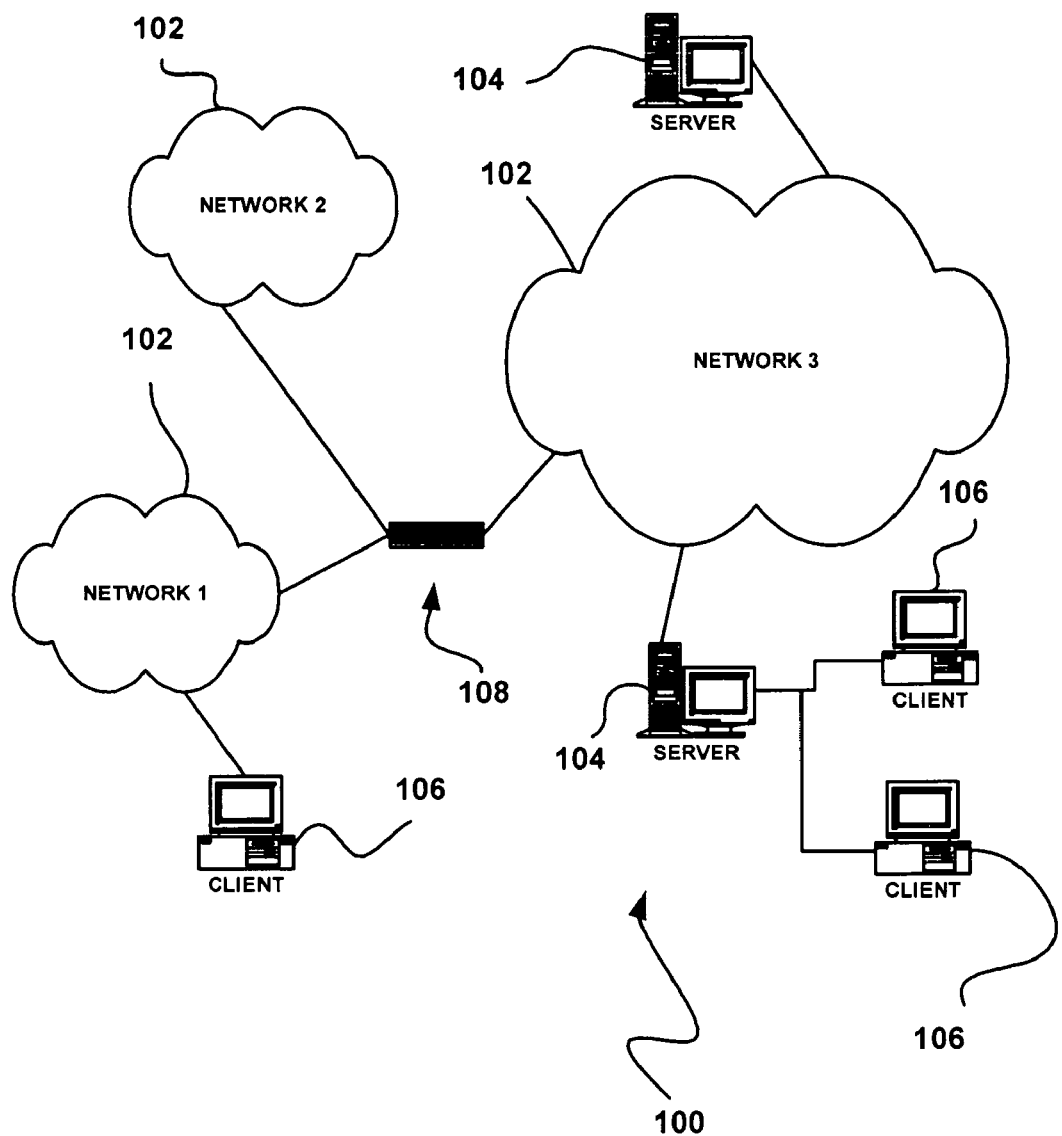
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing computers in the present network architecture 100 may be equipped with a hooking system, method and/or computer program product. In use, a component object model (COM) interface is hooked. In the context of the present description, such hooking may refer to any technique where the COM interface is modified so that subsequent invocations transfer control to different code, etc.

COM include an open standard that specifies how computer components interrelate and interoperate. MICROSOFT®'s ActiveX and OLE technologies are built on top of COM. Whether a COM object is based on OLE or ActiveX, it can be launched within an application, regardless of the programming language. In the context of the present description, COM is deemed to include the similar model by which computers from different machines can be combined (e.g. DCOM, etc.).

To this end, any desired function (e.g. security function, non-security function, etc.) may be performed based on the hooking. More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
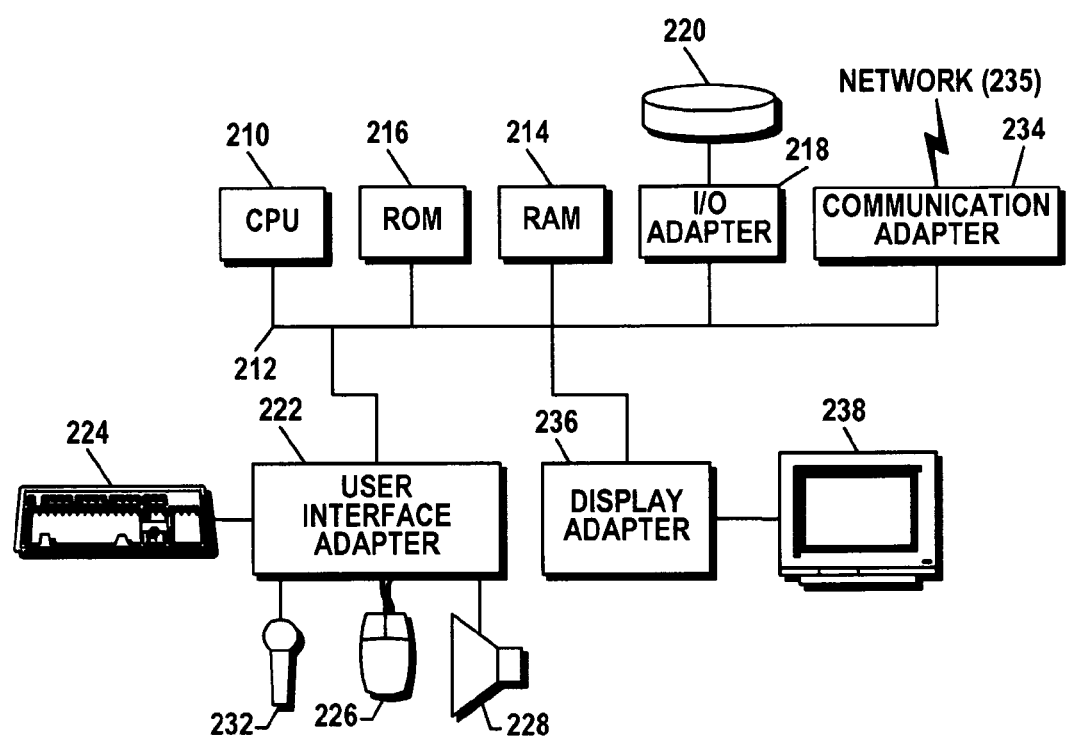
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
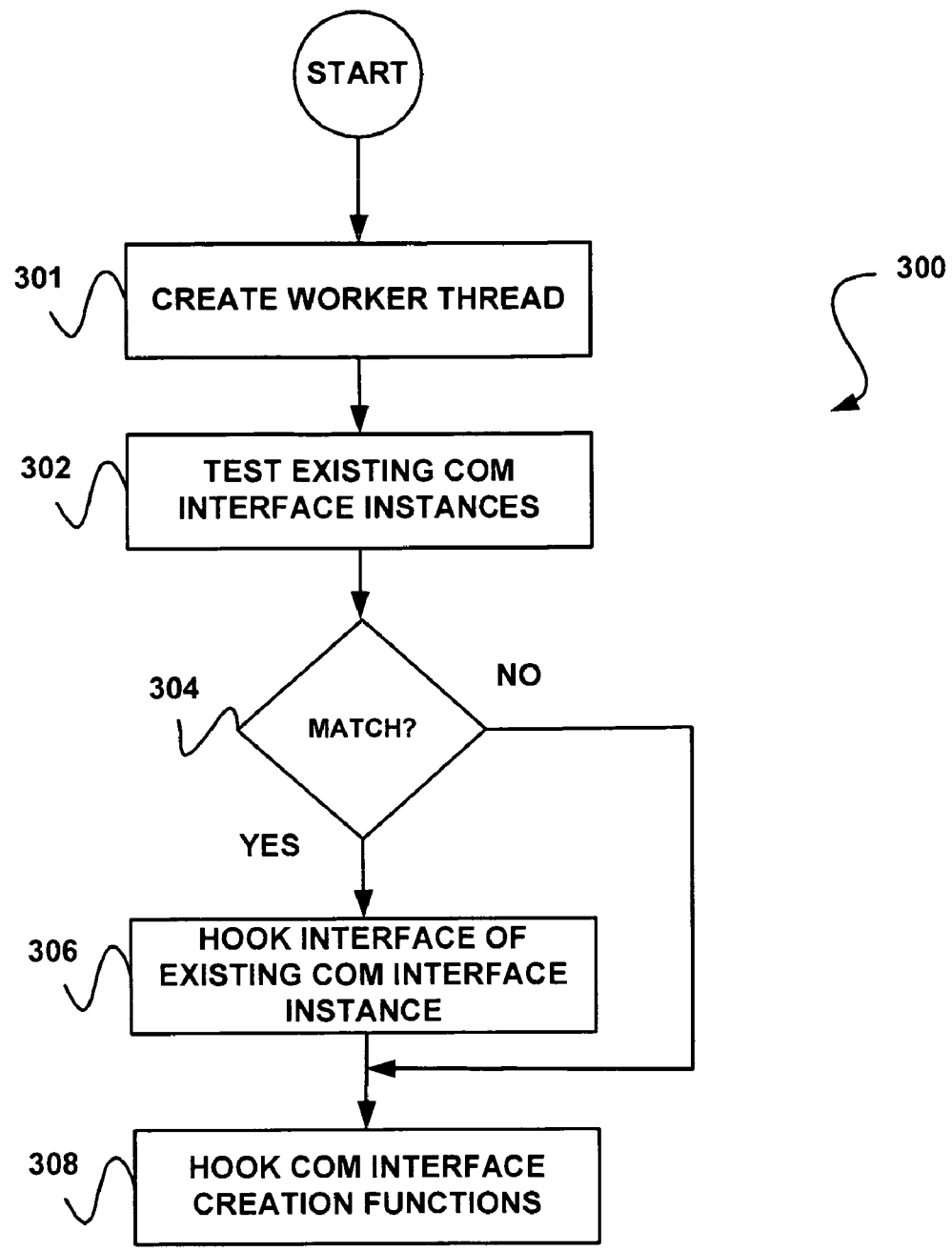
FIG. 3 shows a method for hooking a COM interface, in accordance with one embodiment.

FIG. 3 shows a method 300 for hooking a COM interface, in accordance with one embodiment. As an option, the present method 300 may be implemented in the context of the architecture and environment of FIGS. 1 and/or 2. Of course, however, the method 300 may be carried out in any desired environment. Further, the aforementioned definitions may equally apply to the description below.

The method 300 begins with an attempt to locate an existing instance of a COM interface that matches the characteristics of the COM interface to be hooked. As shown, this is accomplished by creating a worker thread in operation 301. Such worker thread may include any thread other than that associated with a process being monitored or hooked. Further, the worker thread is created upon the initial execution of the hooking application carrying out the functionality of the method 300.

In use, the worker thread sets up a COM apartment model. Apartment-model threading may be used to provide thread safety. In apartment-model threading, each thread is likened to an apartment, where objects created on the thread are associated with, or "live" in, such apartment and are unaware of objects in other apartments. Further apartment-model threading eliminates conflicts in accessing global data from multiple threads by giving each apartment its own copy of global data.

To further facilitate the generation of the COM apartment model, a CoInitialize function is utilized. The CoInitialize function initializes a COM library on the worker thread and identifies the concurrency model as a single-thread apartment (STA). By way of background, applications initialize the COM library before calling COM library functions.

Next, each existing COM interface instance is tested for identifying matching information. See operation 402. Specifically, each COM interface instance is examined to determine whether it has both a matching class identifier (CLSID) and an interface identifier (IID) of interest. The CLSID is a globally unique identifier that identifies a COM class object. It should be noted that such values are set forth for illustrative purposes only and should not be construed as limiting in any manner whatsoever. Specifically, such values are specific to a MICROSOFT® platform, but, of course, it is contemplated that the present framework may be implemented on any desired platform.

This may be accomplished, in one embodiment, by the aforementioned worker thread further invoking a CoCreateInstance function to attempt to locate the matching values. Such function creates on a local system a single uninitialized object of the class associated with a specified CLSID. It should be noted that the worker thread may be used since only one CoInitialize may be invoked for a thread and, once done, the COM apartment model is set and may not be reset. Applying this technique in one of the monitored process threads would run the risk of overriding the apartment model the process needed.

Next, in decision 304, it is determined whether a COM interface exists with CLSID and IID values that match those of the interface to be hooked. If a match is made per decision 304, the interface of the existing COM interface instance is hooked. Note operation 306. It should be noted that each COM interface instance includes one or more interface functions.

In one embodiment, a virtual table (i.e. vtable) for the matching COM interface instance may be extracted if the CLSID and IID are matched. Such vtable includes an array of function pointers to a COM object. Such function pointers cannot necessarily be used across process boundaries.

Armed with the vtable, an entry in the vtable is located which correlates with the interface function associated with the COM interface to be hooked. Further, an address of the interface function to which the entry points is identified and extracted. The interface function at that address may then be hooked and subsequent invocations of such interface function may also be hooked by being routed to callback functions of the hooking application. In use, both entry and exit of the original COM interface function may be monitored via the hook.

Next, in operation 308, a hook is installed for invocation of the functions used to create COM interface instances. This may be done on a per-process basis. Just as an example, the CoCreateInstance function would be hooked. More information regarding such hooking will be set forth in more detail during reference to FIG. 4.

As an option, the aforementioned may be carried out utilizing a security application. Specifically, the security application may include an intrusion detection system (IDS). Of course, non-security-related applications are also envisioned.

Figure 4:
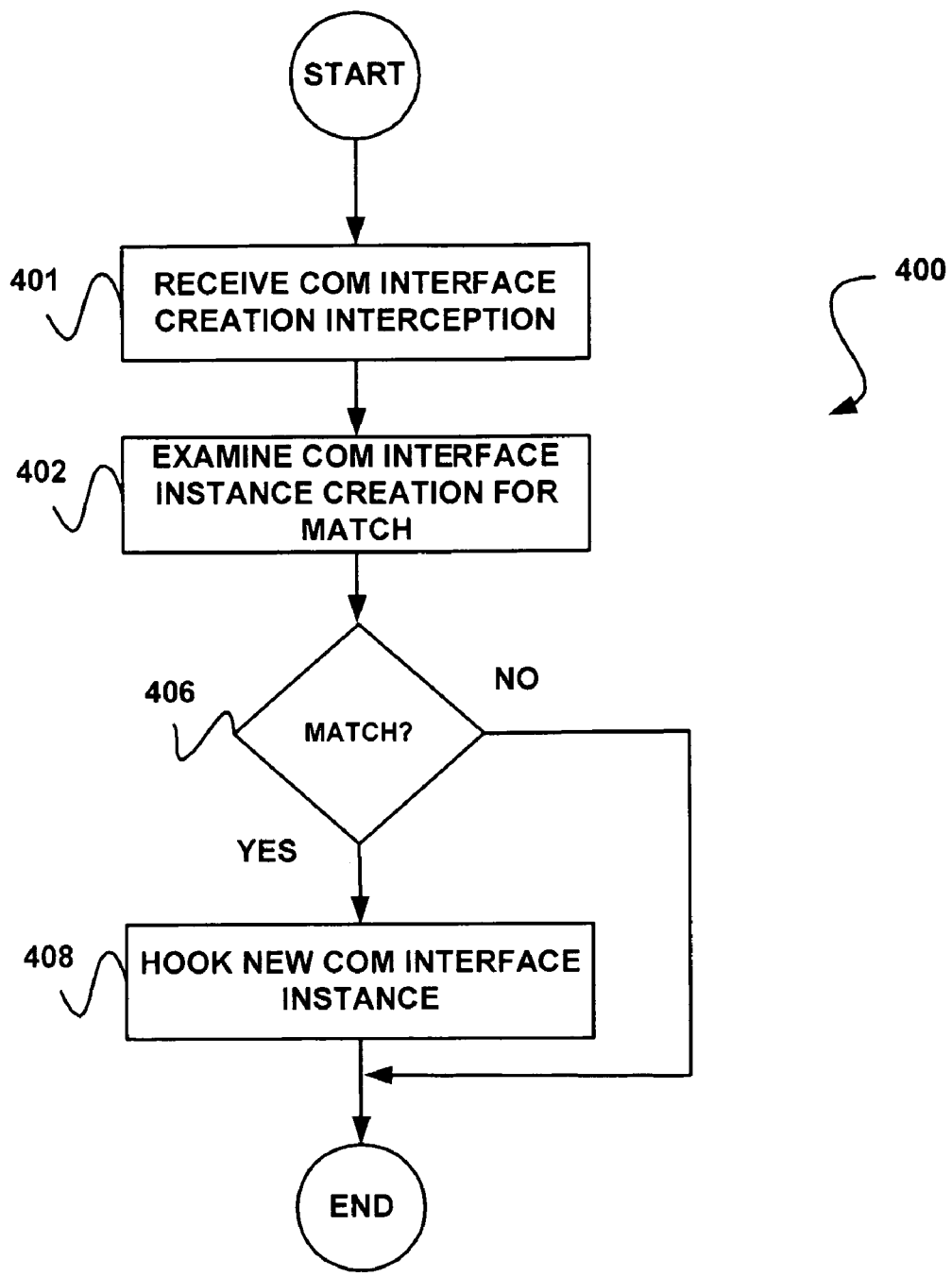
FIG. 4 shows a method for hooking a COM interface, in accordance with another embodiment.

FIG. 4 shows a method 400 for hooking a COM interface, in accordance with another embodiment. As an option, the present method 400 may be implemented in the context of the architecture and environment of FIGS. 1 and/or 2. Of course, however, the method 400 may be carried out in any desired environment. Again, the aforementioned definitions may equally apply to the description below.

As mentioned previously, the method 300 is dedicated for hooking existing COM interface instances. The present method 400, on the other hand, focuses on the hooking of new COM interface instances created after the initial operations of the method 300 is carried out.

As shown, a COM interface creation interception is received in operation 401, as a result of operation 308 of FIG. 3. In response to operation 401, the COM interface instance creation is examined for identifying a match (operation 402). Specifically, the created COM interface instance is examined to determine whether it has both a matching CLSID and an IID of interest.

Next, in decision 406, it is determined whether the created COM interface instance has CLSID and IID values that match those of the interface to be hooked. Such determination is made by the hooking application. If a match is made per decision 406, the interface of the newly created COM interface instance is hooked, utilizing the vtable in a manner similar to that of the method 300 of FIG. 3. Note operation 408.

In one embodiment, a virtual table (i.e. vtable) for the matching COM interface instance may be extracted, if the CLSID and IID are matched. Such vtable includes an array of function pointers to a COM object. Such function pointers cannot necessarily be used across process boundaries.

Armed with the vtable, an entry in the vtable is located which correlates with the interface function associated with the COM interface to be hooked. Further, an address of the interface function to which the entry points is identified and extracted. The interface function at that address may then be hooked and subsequent invocations of such interface function may also be hooked by being routed to callback functions of the hooking application. In use, both entry and exit of the original COM interface function may be monitored via the hook.

Thus, a technique is provided to allow hooking of COM interfaces. Monitoring of COM interfaces may enable a hooking application to register a callback function that is invoked whenever the COM interface is invoked. This, in turn, may optionally allow the hooking application to examine the usage of the interface including call history, arguments passed, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for hooking a component object model (COM) interface comprising:
   receiving an identifier for a COM interface to be hooked;
   creating and executing a worker thread;
   wherein executing said worker thread comprises:
      generating a COM apartment model comprising:
         invoking a CoInitialize function to initialize a COM library and identify a concurrency model as a single-thread apartment; and
         invoking a CoCreateInstance to identify matching values for each COM interface of a plurality of COM interfaces;
         wherein said matching values include both a matching class identifier (CLSID) and an interface identifier (IID);
      determining one of said plurality of COM interfaces that matches the CLSID and IID of said COM interface to be hooked;
      wherein further comprising in response to said determining:
         identifying a virtual table (vtable) for said one of said plurality of COM interfaces;
         identifying an entry associated with an interface function from said vtable; and
         identifying an address of the interface function to which said entry points;
      hooking said one of said plurality of COM interfaces by hooking said interface function at said identified address; and
      performing a function based on said hooking of said interface function.

2. The method of claim 1, wherein subsequent invocations of the interface function are hooked.

3. The method of claim 1, wherein the hooked interface function invocations are routed to a callback function of a intrusion detection system (IDS).

4. The method of claim 3, wherein an entry of the interface function is hooked.

5. The method of claim 3, wherein an exit of the interface function is hooked.

6. The method of claim 1, wherein the interface is hooked utilizing a security application.

7. The method of claim 6, wherein the security application includes an intrusion detection system (IDS).

8. The method of claim 1, wherein the function includes a security function.

9. A computer program product embodied on a non-transitory computer readable medium comprising instruction that when executed by a processor performs the steps of:
   receiving an identifier for a COM interface to be hooked;
   creating and executing a worker thread;
   wherein executing said worker thread comprises:
      generating a COM apartment model comprising:
         invoking a CoInitialize function to initialize a COM library and identify a concurrency model as a single-thread apartment; and
         invoking a CoCreateInstance to identify matching values for each COM interface of a plurality of COM interfaces;
         wherein said matching values include both a matching class identifier (CLSID) and an interface identifier (IID);
      determining one of said plurality of COM interfaces that matches the CLSID and IID of said COM interface to be hooked;
      wherein further comprising in response to said determining:
         identifying a virtual table (vtable) for said one of said plurality of COM interfaces;
         identifying an entry associated with an interface function from said vtable; and
         identifying an address of the interface function to which said entry points;
      hooking said one of said plurality of COM interfaces by hooking said interface function at said identified address; and
      performing a function based on said hooking of said interface function.

10. A system comprising a processor that performs the steps of:
   receiving an identifier for a COM interface to be hooked;
   creating and executing a worker thread;
   wherein executing said worker thread comprises:
      generating a COM apartment model comprising:
         invoking a CoInitialize function to initialize a COM library and identify a concurrency model as a single-thread apartment; and
         invoking a CoCreateInstance to identify matching values for each COM interface of a plurality of COM interfaces;
         wherein said matching values include both a matching class identifier (CLSID) and an interface identifier (IID);
      determining one of said plurality of COM interfaces that matches the CLSID and IID of said COM interface to be hooked;
      wherein further comprising in response to said determining:
         identifying a virtual table (vtable) for said one of said plurality of COM interfaces;
         identifying an entry associated with an interface function from said vtable; and
         identifying an address of the interface function to which said entry points;
   hooking said one of said plurality of COM interfaces by hooking said interface function at said identified address; and
   performing a function based on said hooking of said interface function on said processor.

* * * * *